(12) United States Patent
Yokota et al.

(10) Patent No.: US 7,064,467 B2
(45) Date of Patent: Jun. 20, 2006

(54) COMMUTATOR MOTOR

(75) Inventors: Tomoyoshi Yokota, Hitachinaka (JP);
Shinichi Sakamoto, Hitachinaka (JP);
Chikai Yoshimizu, Hitachinaka (JP);
Katsuhiro Oomori, Hitachinaka (JP);
Tadayoshi Mineta, Yamagata-ken (JP);
Kenichi Kato, Yamagata (JP)

(73) Assignee: Hitachi Koki Co., Ltd., Tokyo (JP)

( * ) Notice: Subject to any disclaimer, the term of this patent is extended or adjusted under 35 U.S.C. 154(b) by 24 days.

(21) Appl. No.: 10/661,560

(22) Filed: Sep. 15, 2003

(65) Prior Publication Data

US 2004/0061406 A1    Apr. 1, 2004

(30) Foreign Application Priority Data

Sep. 30, 2002    (JP) .......................... P2002-286275

(51) Int. Cl.
*H02K 1/00*    (2006.01)
(52) U.S. Cl. ................................... 310/215
(58) Field of Classification Search ............... 310/216, 310/217, 218, 254, 154.08, 154.09; H02K 1/17
See application file for complete search history.

(56) References Cited

U.S. PATENT DOCUMENTS

| | | | | |
|---|---|---|---|---|
| 4,453,097 A | * | 6/1984 | Lordo | 310/154.07 |
| 5,175,460 A | * | 12/1992 | Ishizuka | 310/154.09 |
| 5,338,996 A | * | 8/1994 | Yamamoto | 310/217 |
| 5,847,903 A | * | 12/1998 | Ogawa et al. | 360/264.8 |
| 5,920,139 A | * | 7/1999 | Fujiwara et al. | 310/154.11 |
| 6,023,119 A | * | 2/2000 | Asao | 310/216 |
| 6,301,773 B1 | * | 10/2001 | Chemburkar | 29/596 |
| 6,756,709 B1 | * | 6/2004 | Kobayashi et al. | 310/43 |

FOREIGN PATENT DOCUMENTS

| | | | |
|---|---|---|---|
| GB | 2 209 878 | * | 5/1989 |
| GB | 2 209 878 A | | 5/1989 |
| JP | 11-122889 | | 4/1999 |
| JP | 11-136883 A | | 5/1999 |
| JP | 2002-64950 | | 2/2002 |
| WO | WO 02/075900 A1 | | 9/2002 |

OTHER PUBLICATIONS

European Search Report dated Jan. 8, 2004.

* cited by examiner

*Primary Examiner*—Darren Schuberg
*Assistant Examiner*—Nguyen Hanh
(74) *Attorney, Agent, or Firm*—McGuireWoods LLP

(57) ABSTRACT

A commutator motor includes a stator and a rotor, and the stator includes a stator yoke and a field magnet. The field magnet is fixed onto the inner peripheral surface of the substantially cylindrical stator yoke. The stator yoke is configured by coaxially stacking a plurality of plate-like annular bodies, and the annular bodies are fixedly connected to each other by caulking at a caulking portion disposed on the annular body. In manufacture, the length of the stator yoke in the axial direction can be arbitrarily changed with the thickness of the annular body in the axial direction as a minimum unit. In case of manufacturing various stator yokes that are different in the axial length, the necessity of replacing a manufacturing machine is eliminated, thereby providing a commutator motor having the stator yoke which is low in the manufacturing costs.

5 Claims, 8 Drawing Sheets

COMMUTATOR MOTOR

BACKGROUND OF THE INVENTION

The present invention relates to a commutator motor, and more particularly, to a commutator motor which is employed for a power tool or the like and mainly driven by a battery, and is relatively large in size.

As a motor employed for the power tool or the like, a commutator motor is known, and the commutator motor of this type is generally driven by a battery.

Japanese Patent Application Publication No. Hei-11-136883 discloses a commutator motor which is relatively small in size. The commutator motor includes a housing, a stator, an armature, a brush and a commutator, and the stator includes a cylindrical stator yoke which is substantially rectangular columnar in contour and a field magnet. The inner peripheral surface of the stator yoke is circular in a section vertically taken along an axial direction thereof, while an outer peripheral surface of the stator yoke has a rectangular cross-section. The rectangular outer surface portion has four corners, and a yoke section projecting radially outwardly is provided at each corner. A field magnet is disposed between the neighboring two yoke sections. Therefore, there are four field magnets in total which are fixed to positions that are radially outside of the stator yoke and opposite to each other in the diameter direction of the stator yoke. The stator yoke is structured by stacking steel plates on each other, and the field magnet is formed of a permanent magnet. Four field magnetic poles are generated at the stator by the field magnet, and a magnetic field is developed by the four field magnetic poles.

The brush is fixed to the housing through a brush retaining device. The housing is substantially cylindrical and coaxially connected to the stator yoke in an immovable manner. The brush retaining device is disposed on and protrudes radially inwardly from an inner peripheral surface of the housing, and the brush projects inwardly in the radial direction of the housing by the brush retaining device. The brush is electrically connected to a battery that constitutes a power source.

The armature is disposed inside of the stator and includes a shaft, a core and a coil. The shaft is disposed at the position of the axial center of the stator yoke so as to be rotatable with respect to the stator yoke. The core is fixed to the shaft and has a plurality of slots formed therein. A conductor wire is wound around the core while being hooked by the slots, and the wounded conductor wire forms a coil. Also, the substantially columnar commutator is coaxially fixed to the shaft at a position on the shaft opposing the brush, and the shaft is so structured as to rotate together with the commutator and the core. The commutator is electrically connected to the coil and always comes in contact with the brush. An electrical current is supplied to the coil through the brush and the commutator so that a rotational torque is developed in the armature.

In the conventional commutator motor described above, the stator yoke is structured by stacking the steel plates on each other. However, there is no disclosure of a method for coupling the adjacent steel plates to each other in the stacking direction. For example, it is conceivable that the adjacent steel plates are fixed to each other by caulking. However, because the conventional permanent magnet commutator motor is small in size, there is a fear that the steel plates are deformed when concaves and convexes are formed on the steel plates for caulking, and it is actually impossible to fix the steel plates by caulking. Also, because the field magnet is disposed on the radially outer side of the stator yoke, the magnetic flux cannot be effectively utilized, which lowers performance of the motor.

SUMMARY OF THE INVENTION

Under the above circumstances, it is an object of the present invention to provide a commutator motor which can effectively utilize the magnetic flux in which steel plates adjacent to each other in the stacking direction are fixed to each other by caulking so as to be coupled to each other to provide a stator yoke.

This and other objects of the present invention will be attained by a commutator motor including an improved stator, and an armature. The stator includes a stator yoke and a field magnet. The stator yoke has a tubular shape and extends in its axial direction and has an inner peripheral surface. The field magnet is fixed to the inner peripheral surface of the stator yoke for providing a field magnetic pole in the stator. The armature is rotatably disposed within the stator. The stator yoke is constituted by a plurality of plate-like annular bodies having iron parts which are stacked on each other coaxially in the axial direction of the stator yoke. Alternatively, the stator yoke is constituted by a plurality of substantially identically configured iron plate-like arcuate bodies disposed at such position as to form a part of virtual annular bodies and which are stacked on each other coaxially in the axial direction of the stator yoke. The plurality of plate-like annular bodies or the plate-like arcuate bodies adjacent to each other in the stacked direction are fixedly connected to each other by caulking.

In the commutator motor of the present invention, because a field magnet is disposed on the inner peripheral surface of the stator yoke, the magnetic flux can be effectively utilized, to thereby provide a high-performance commutator motor. Also, because a plurality of annular bodies or arcuate bodies that are adjacent to each other in the stacking direction are fixedly connected to each other by caulking, it is possible that the stator yoke can be readily manufactured by stacking the plurality of annular bodies on each other.

Also, because a plurality of plate-like annular bodies or arcuate bodies are coaxially stacked in the axial direction of the stator yoke to structure the stator yoke, the thickness of the annular body or arcuate body in the axial direction can be set to a minimum unit, and the number of stacked annular bodies or arcuate bodies is set to a desired number, thereby being capable of arbitrarily setting the length of the stator yoke in the axial direction. Since the number of stacked annular bodies or arcuate bodies can be automatically set in a pressing machine, the setting of the axial length can be easily changed without the necessity of replacing the machine even if the various stator yokes having axial lengths different from each other are to be manufactured. Accordingly, in manufacturing the stator yokes different in the axial length, the costs can be reduced. Also, because the annular bodies or arcuate bodies are manufactured by the pressing machine, the configuration of the annular bodies or arcuate bodies can be made an arbitrary shape by changing the die of the pressing machine. For example, it is easy to partially dispose convex portions or the like on the inner peripheral surface of the annular bodies.

DETAILED DESCRIPTION OF THE PREFERRED EMBODIMENTS

Figure 1:
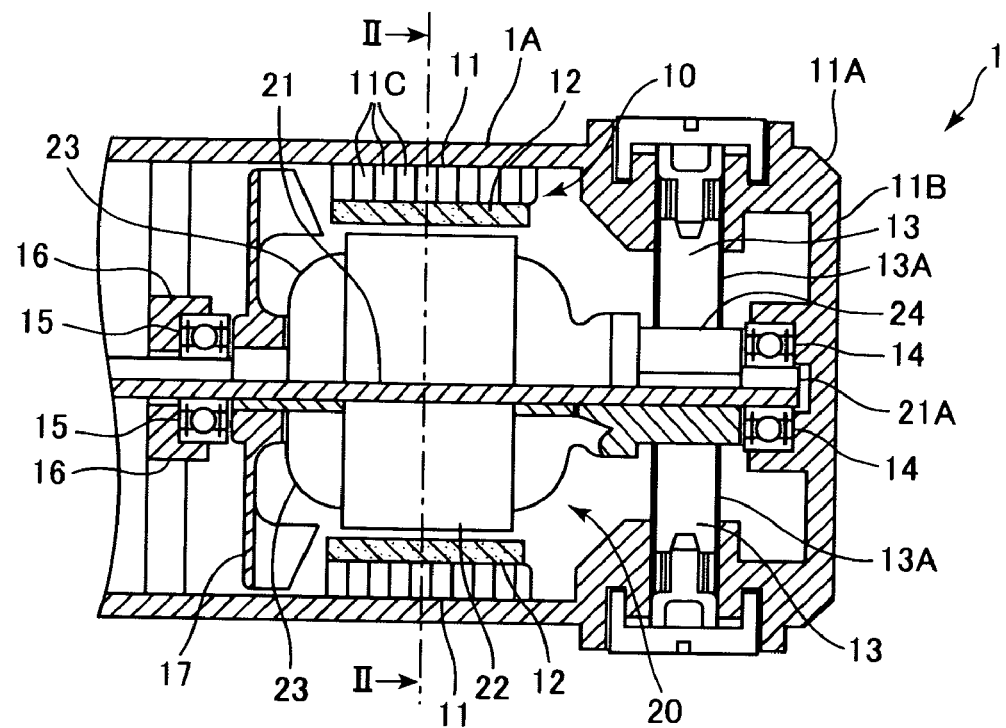
FIG. 1 is a cross-sectional view showing an essential portion of a commutator motor according to a first embodiment of the present invention.

A commutator motor 1 according to a first embodiment of the present invention will be described with reference to FIGS. 1 to 4. The commutator motor 1 includes a housing 1A, a stator 10, an armature 20, a brush 13 and a commutator 24 as shown in FIG. 1. The housing 1A is substantially cylindrical, and a part of the inner periphery of the housing 1A is fitted with an outer peripheral surface of a stator yoke 11 described later. The stator 10 includes the stator yoke 11 and two field magnets 12. The stator yoke 11 is substantially cylindrical. The thickness of the stator yoke 11 in the radial direction is in a range of from about 3 mm to 10 mm. The outer diameter of the stator yoke 11 coincides with the inner diameter of the housing 1A and the outer peripheral surface of the stator yoke 11 is fixed to a part of the inner peripheral surface of the housing 1A.

Figure 2:
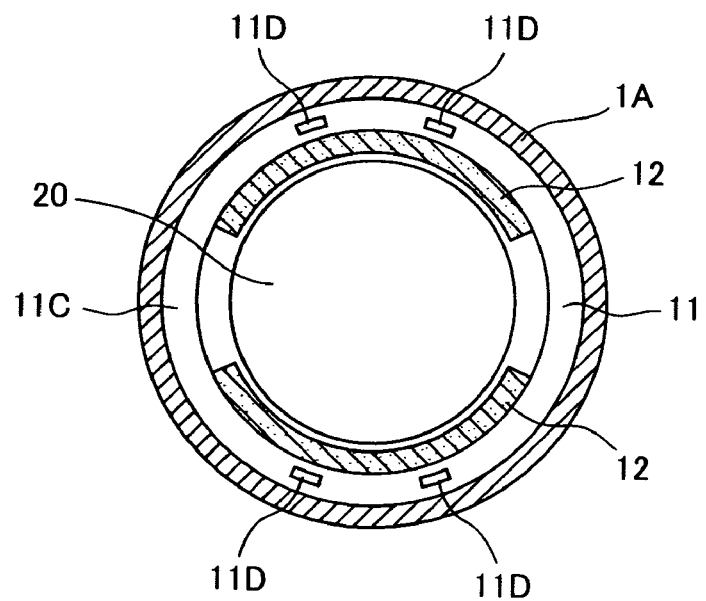
FIG. 2 is a cross-sectional view taken along a line II—II of FIG. 1.

Each of the two field magnets 12 is formed of a permanent magnet, and obtained by bending the rectangular plate-like permanent magnet into arcuate shape. The arcuate surface of the field magnet 12 coincides with the arc of the inner peripheral surface of the stator yoke 11, and the two field magnets 12 are fixed to parts of the inner peripheral surface of the stator yoke 11 at positions opposite to each other in the diameter direction of the stator yoke 11 by an adhesive, respectively. Accordingly, when viewed in cross-section of the housing 1A in the radial direction, as shown in FIG. 2, the field magnet 12, the stator yoke 11 and the housing 1A are arranged in the stated order from the interior of the housing 1A toward the exterior thereof in the radial direction. Two field magnetic poles are generated in the stator 10 by the two field magnets 12, and a magnetic field is generated by the two field magnetic poles.

A brush holder 13A for retaining the two brushes 13 is disposed at a portion of the inner peripheral surface of the housing 1A where the stator yoke 11 is not disposed. The brush 13 is contained and retained within the brush holder 13A fixed on the inner peripheral surface of the housing 1A and projects inwardly in the radial direction of the stator yoke 11 in a state where the brush 13 is urged by a spring (not shown) which is disposed within the brush holder 13A. The brush 13 is electrically connected to a battery (not shown) which constitutes a power source via a lead wire (not shown). One end 11A of the housing 1A forms a cap portion 11B that covers the one end 11A, and the other end of the housing 1A (not shown) is equipped with a fixing portion 16 that fixes a bearing 15 for rotatably supporting a shaft 21 that will be described later.

The armature 20 is disposed inside of the stator 10. The armature 20 includes the shaft 21, a core 22 and a coil 23. One end 21A of the shaft 21 is supported by a bearing 14 disposed in the cap portion 11B, and the other end of the shaft 21 is supported by the bearing 15 disposed in the fixing portion 16. The rotation axis of the shaft 21 is coincide with the axial center of the stator yoke 11. The core 22 is fixed to a part of the shaft 21, and a plurality of slots (not shown) are formed in the core 22. A conductor wire is wound around the core 22 so as to be hooked by the slots (not shown), and the wounded conductor wire forms the coil 23. The coil 23 faces the field magnet 12 of the stator 10.

The substantially columnar commutator 24 is coaxially fitted to the shaft 21 at a portion close to one end 21A of the shaft 21, and the commutator 24 is rotatable together with the shaft 21 and the core 22. The commutator 24 is electrically connected to the coil 23. Also, the commutator 24 is so positioned in contact with the brush 13. Electrical current is supplied to the coil 23 from the battery (not shown) through the brush 13 and the commutator 24 so as to generate a rotational torque in the armature 20. Also, a cooling fan 17 is fitted to the shaft 21, and the cooling fan 17 is so structured as to rotate together with the shaft 21 to cool the armature 20.

Figure 3:
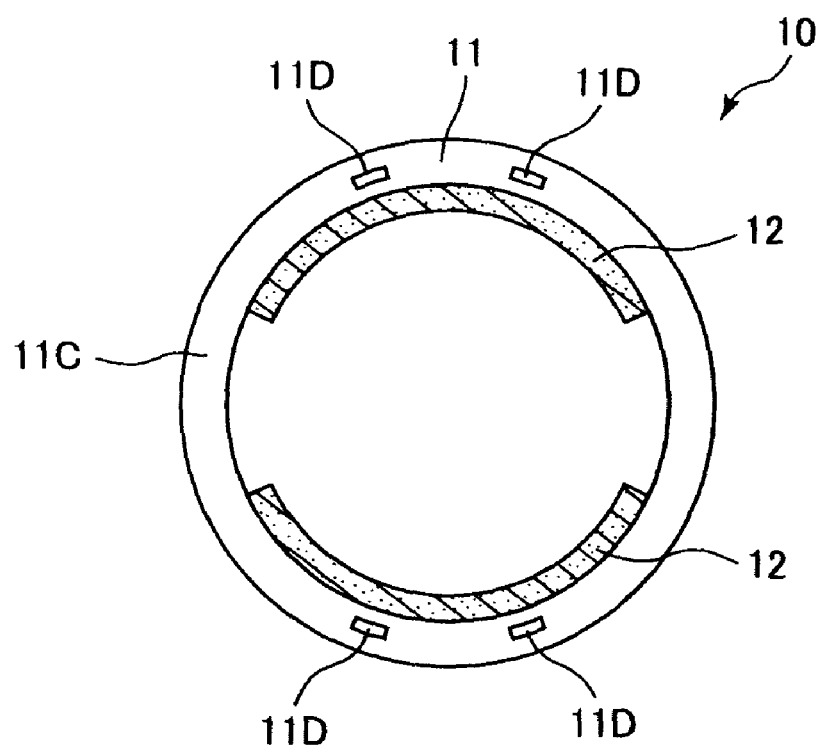
FIG. 3 is a cross-sectional view showing a stator of the commutator motor according to the first embodiment of the present invention.
Figure 4:
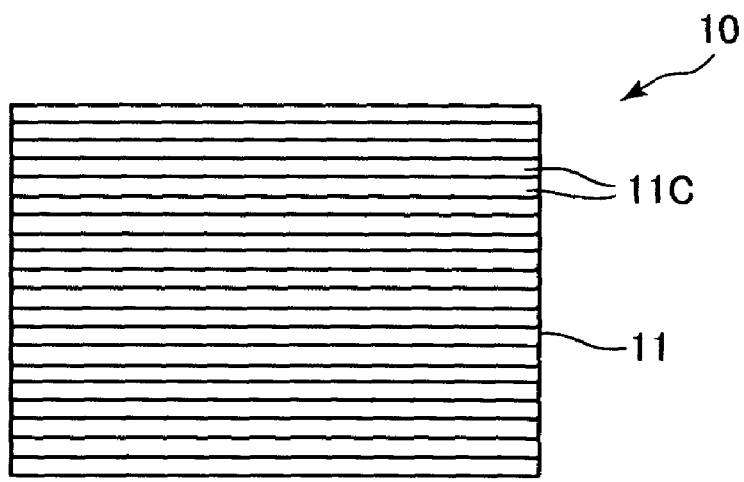
FIG. 4 is a side view showing an essential portion in a state where annular bodies are stacked on each other in a stator yoke of the commutator motor according to the first embodiment of the present invention.

Next, the stator yoke 11 will be described in more detail. The stator yoke 11 is structured by annular bodies 11C as shown in FIG. 3. The annular bodies 11C are made of iron and disposed in plural numbers, and as shown in FIG. 4, the annular bodies 11C are coaxially stacked on each other in the axial direction of the stator yoke 11. The annular bodies 11C are manufactured by punching a plate-like iron plate by an iron-plate press die. For that reason, the annular bodies 11C has a small thickness in the axial direction of the stator yoke 11. The order in which the annular bodies 11C are stacked corresponds to the progressive press.

Four caulking portions 11D are disposed at positions between the outer periphery and the inner periphery of the annular bodies 11C, respectively, and the respective two caulking portions 11D are disposed along the peripheral direction at positions corresponding to the fixing position to which two field magnets are fixed, respectively, after the annular bodies 11C are stacked on each other. The respective two caulking portions 11D have a rotationally symmetric positional relationship about the axial center of the stator yoke 11, respectively, and the positions at which the caulking portions 11D are disposed are in the vicinity of the center position of the field magnetic pole in the stator 10.

Regarding neighboring two annular bodies, one annular body has a first contact face facing a second contact face of the other annular body, and the caulking portions 11D at the first contact face of one annular body form convex portions. On the other hand, caulking portions 11D at the second contact face of the other annular body form concave portions fittable with the convex portions. Therefore, in the plurality of annular bodies 11C that are coaxially stacked on each other in the axial direction of the stator yoke 11, the convex portions of the caulking portions 11D of one annular body 11C is fitted into the concave portions of the caulking portions 11D of the other annular body 11C that is adjacent to the one annular body 11C, respectively, to thereby perform caulking fixing. After the annular bodies 11C are stacked on each other and then fixed by caulking to manufacture a cylindrical stator yoke 11, the field magnet 12 is fixed onto the inner peripheral surface of the stator yoke 11 by an adhesive.

Because the annular bodies 11C are fixed by caulking through the caulking portions 11D, it is possible that the plurality of annular bodies 11C are readily stacked on each other to manufacture the stator yoke 11. Also, because the field magnet 12 is fixed onto the inner peripheral surface of the substantially cylindrical stator yoke 11, the loss of a magnetic force can be reduced so that a high-performance commutator motor 1 can be provided. Also, since the width of the respective annular bodies in the radial direction is 3 mm to 10 mm, which is relatively large, the caulking portions can be readily provided by press machining.

Also, because the stator yoke 11 is formed by stacking the plate-like annular bodies 11C, the thickness of the annular body 11C in the axial direction can be the minimum unit length. When the number of stacked annular bodies 11C is set to a desired number, the length of the stator yoke 11 in the axial direction can be arbitrarily set. Also, since the number of stacked annular bodies 11C can be automatically set in a press machine, it is possible that the setting of the axial length can be readily changed without the necessity of replacing the machine even if various stator yokes 11 having the axial lengths different from each other are to be manufactured. Accordingly, cost reduction can be achieved in manufacturing various stator yokes 11 having axial lengths different from each other.

A commutator motor according to a second embodiment of the present invention will next be described with reference to FIG. 5. The commutator motor according to the second embodiment is different from the commutator motor 1 according to the first embodiment only in that the field magnet 12 is retained on the inner peripheral surface of the stator yoke 11 not by an adhesive but by convex portions 31E protruding radially inwardly from the inner peripheral surface of the stator yoke 11.

Figure 5:
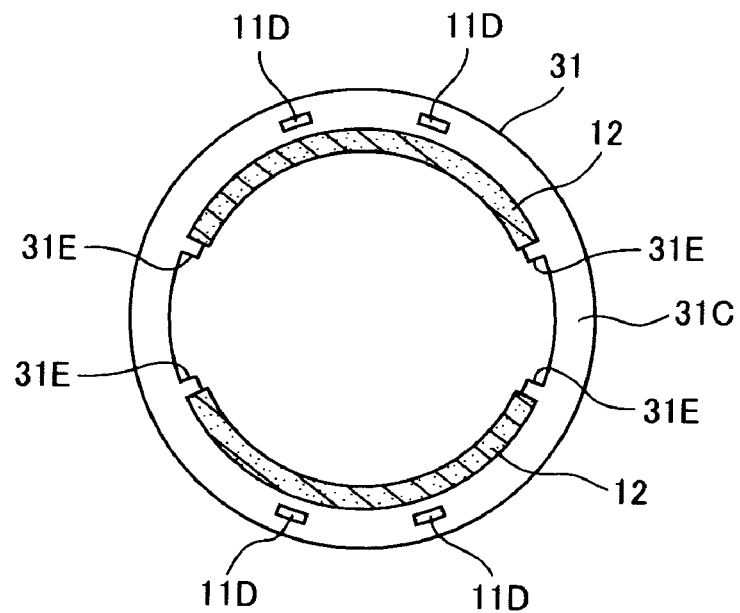
FIG. 5 is a cross-sectional view showing a stator of a commutator motor according to a second embodiment of the present invention.

As shown in FIG. 5, the annular body 31C that constitutes a part of the stator yoke 31 which retains the field magnets 12 on the inner peripheral surface thereof is equipped with two pairs of convex portions 31E, i.e., four in total, for retaining the two field magnets 12. The convex portions 31E are disposed at positions of the end portions of the field magnets 12, which are retained on the inner peripheral surface of the stator yoke 31, respectively, in the peripheral direction of the stator yoke 31. The convex portions 31E project inwardly in the radial direction of the stator yoke 31, and the thickness of the stator yoke 31 in the radial direction at the portions where the convex portions 31E are disposed becomes larger than that of remaining portions. A distance between the respective pairs of convex portions 31E in the peripheral direction of the stator yoke 31 is slightly smaller than the length of the field magnet 12 in the same direction, and one of the field magnets 12 is press-inserted between one pair of convex portions 31E so as to be held between the pair of convex portions 31E. Similarly, the other field magnet 12 is press-inserted between the other pair of convex portions 31E so as to be held between the other pair of convex portions 31E. Therefore, no adhesive is required for fixing the field magnets 12 on the inner peripheral surface of the stator yoke 31.

The convex portions 31E are not attached to the manufactured annular bodies later, but are manufactured integrally with the annular body by the press machine. The convex portions 31E are linearly arrayed in the axial direction of the stator yoke 3 on the inner peripheral surface thereof.

Because the field magnet 12 can be retained by the convex portions 31E disposed on the annular body 31C, it is unnecessary to conduct positioning of the field magnet 12 in mounting the field magnets 12 on the inner peripheral surface of the stator yoke 31. Also, because the field magnet 12 is retained on the inner peripheral surface of the stator yoke 31 by holding the field magnet 12 between a pair of convex portions 31E, the field magnet 12 can be fixed on the inner peripheral surface of the stator yoke 31 without using an adhesive. In the case of using the adhesive, there is required a jig for holding the field magnet 12 in press contact with the stator yoke 31 while the adhesive is applied and dried. Also, a time is consumed for drying the adhesive, and the manufacturing costs are increased. However, because the adhesive is not used in this embodiment, the manufacturing costs can be reduced.

Incidentally, in the conventional commutator motor, the stator yoke is manufactured by bending machining, and when the thickness of the stator yoke in the radial direction is 3 mm or less in this case, the yoke portion of the stator yoke is notched and bent, thereby being capable of providing the convex portions on the inner peripheral surface of the stator yoke. However, in this case, since the notched portion becomes a cavity, so that the yoke portion of the stator yoke does not effectively serve as a magnetic path, a main magnetic flux generated by the field magnet is reduced, and the efficiency of the commutator motor is lowered. Alternatively, an external force is exerted on the yoke portion of the stator yoke from the outer periphery to plastically deform the stator yoke so that a projection can be provided on the inner surface. However, since the yoke portion of the deformed stator yoke is reduced in thickness in the radial direction of the stator yoke due to a tension or a compression applied during formation thereof by the bending machining, the main magnetic flux will also be reduced.

On the contrary, in the second embodiment, no gap is generated, and also, because the thickness of the stator yoke 31 in the radial direction becomes larger because of the provision of the convex portions 31E, the efficiency of the commutator motor can be prevented from being lowered without causing a reduction in the main magnetic flux.

Next, a commutator motor according to a third embodiment of the present invention will be described with reference to FIG. 6. The commutator motor according to the third embodiment is different from the commutator motor 1 according to the first embodiment only in that the grooves 41a directed to the axial direction of the stator yoke 41 are formed on the inner peripheral surface of the stator yoke 41.

Figure 6:
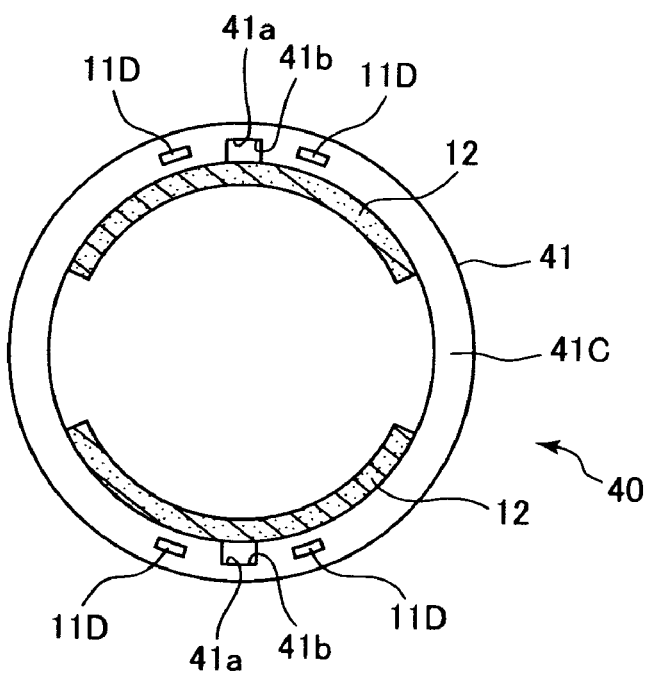
FIG. 6 is a cross-sectional view showing a stator in a commutator motor according to a third embodiment of the present invention.

As shown in FIG. 6, concave portions 41b are defined on the inner peripheral surface of the annular body 41C that constitutes a part of the stator yoke 41 that retains the field magnet 12 on the inner peripheral surface. Each of the concave portions 41b has a U-shape. In a state where the annular bodies 41C are stacked and the field magnet 12 are fixed onto the inner peripheral surface of the stator yoke 41, a hollow groove 41a directed to the axial direction of the stator yoke 41 is formed. When viewed in a cross-section of the stator yoke 41 in the radial direction, each of the concave portions 41b is positioned in the substantially center of the field magnetic pole generated in the stator 40 by two field magnets 12.

Figure 7:
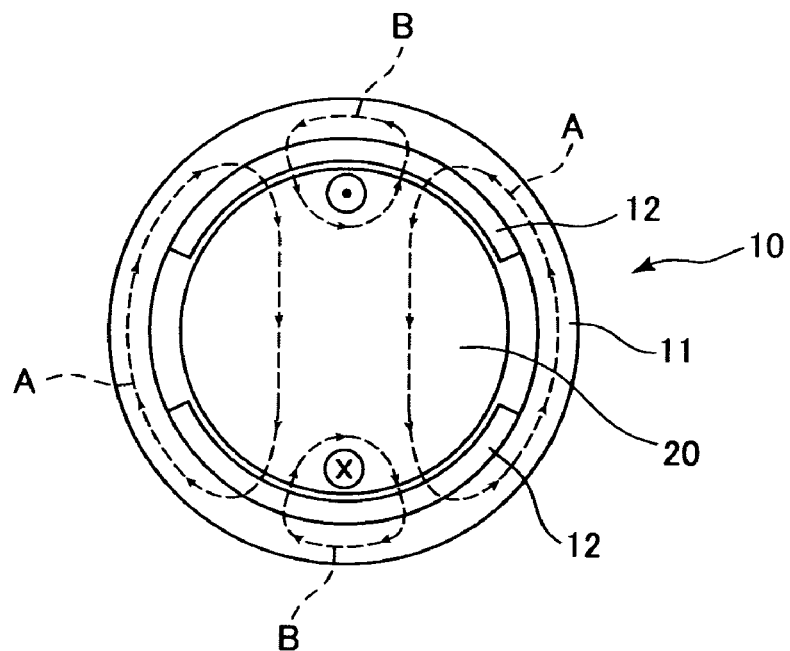
FIG. 7 is a conceptual view showing a flow of a main magnetic flux and a flow of an armature reaction magnetic flux in the commutator motor according to the first embodiment of the present invention.

As a recent demand, the thickness of the stator yoke in the radial direction is increased as described above. However, as the thickness becomes larger, the magnetic resistance of the stator yoke become smaller, and in the commutator motor 1 according to the first embodiment, as shown in FIG. 7, an armature reaction magnetic flux B is liable to flow, which is generated due to the armature magnetomotive force developed by allowing a current to flow in the coil of the armature 20, when the commutator motor is driven. Since the armature reaction magnetic flux B impedes a flow of the main magnetic flux A developed by the field magnet 12 and induces the reduction of the rotational torque of the armature 20, the efficiency of the commutator motor is lowered. As shown in FIG. 7, because the flow of the main magnetic flux A is divided into the right and left sides of FIG. 7 through the core of the armature 20 and the stator yoke 11 of the stator 10 and becomes minimum in the vicinity of the center position of the field magnetic pole of the stator 10, the main magnetic flux A is not reduced even if the grooves 41a are formed as in the third embodiment so that the sectional area of the stator yoke 41 at the substantially center position of the field magnetic pole is reduced. In the third embodiment, by forming the grooves 41a at the substantially center position of the field magnetic pole, the sectional area of the field magnetic path at the same position of the stator yoke 41 can be reduced so that the magnetic resistance in the magnetic path along which the conventional armature reaction magnetic flux B flows as shown in FIG. 7 can be increased, an influence of the armature reaction magnetic flux can be lessened, and the main magnetic flux is made to effectively contribute to the torque, thereby being capable of improving the efficiency of the commutator motor.

Next, a commutator motor according to a fourth embodiment of the present invention will be described with reference to FIG. 8. The commutator motor according to the fourth embodiment is different from the commutator motor according to the second embodiment only in that the grooves 41a directed to the axial direction of the stator yoke 51 are formed on the inner peripheral surface of the stator yoke 51. Accordingly, the commutator motor according to the fourth embodiment is so structured as to provide all of the features of the commutator motors according to the first to third embodiments. The configuration, the position and the number of the concave portions 41b of the annular body 51C that constitutes the groove 41a are identical with the configuration, the position and the number of the concave portions 41b of the commutator motor 1 according to the third embodiment. Also, the configuration, the position and the number of the convex portions 31E disposed on the annular portion 51C are identical with the configuration, the position and the number of the convex portions 31E of the commutator motor according to the second embodiment.

Since the cross-sectional area of the field magnetic path at the substantially center position of the field magnetic pole can be reduced by forming the grooves 41a, the magnetic resistance in the magnetic path along which the armature reaction magnetic flux flows can be increased and an influence of the armature reaction magnetic flux can be lessened, whereupon the main magnetic flux can be made to effectively contribute to the torque, thereby being capable of improving the efficiency of the commutator motor.

Further, because the field magnet 12 is retained by the convex portions 31E, it is unnecessary to conduct positioning of the magnet in mounting the field magnets 12 on the inner peripheral surface of the stator yoke 51. Also, because the field magnet 12 is retained on the inner peripheral surface of the stator yoke 51 by holding the field magnet 12 between a pair of convex portions 31E, it is unnecessary to fix the field magnet 12 on the inner peripheral surface of the stator yoke 51 by using an adhesive. Consequently, the manufacturing costs can be reduced. Also, because the thickness of the stator yoke 51 in the radial direction becomes larger because of the provision of the convex portions 31E, the efficiency of the commutator motor can be prevented from being lowered without causing a reduction in the main magnetic flux.

Figure 9:
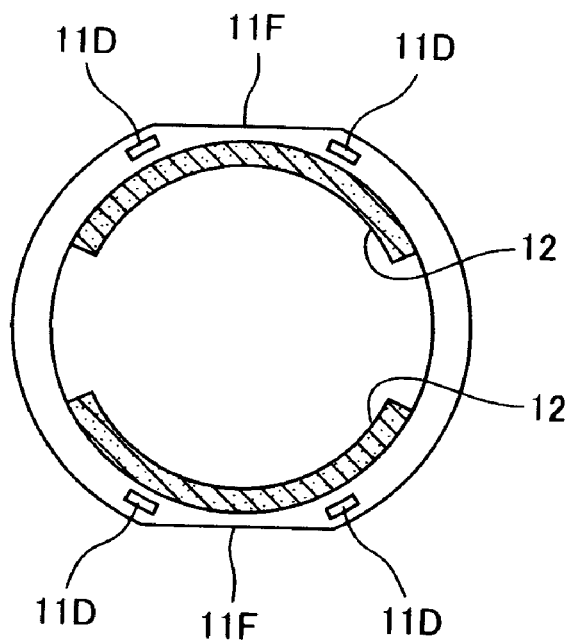
FIG. 9 is a cross-sectional view showing a stator of a commutator motor according to a modification to the first embodiment of the present invention.

The commutator motor according to the present invention is not limited to the above-mentioned emobodiments, but various modifications are conceivable. For example, in the commutator motor according to the first embodiment, the cross-section of the stator yoke 11 in the radial direction is circular in both of the outer periphery and the inner periphery thereof. Alternatively, as shown in FIG. 9, the outer peripheral positions that correspond to positions at which the field magnets 12 are fixed may be linear portions 11F that are linearly notched.

Figure 10:
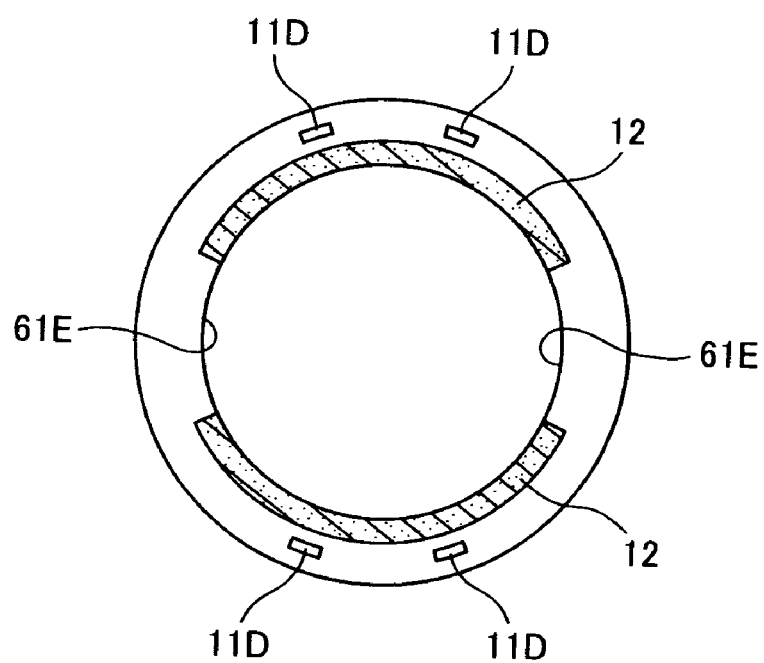
FIG. 10 is a cross-sectional view showing a stator of a commutator motor according to a first modification to the second embodiment of the present invention.

Also, in the commutator motor according to the second embodiment, two pairs of convex portions 31E radially inwardly protrude at positions corresponding to the end portions of the field magnets 12 that are retained on the inner peripheral surface of the stator yoke 31, respectively in the peripheral direction of the stator yoke 31. However, instead of the four convex portions 31E, it is possible that parts of the stator yoke where the field magnet 12 is not disposed on the inner peripheral surface thereof are made larger in thickness in the radial direction to be two convex portions 61E with which two field magnets 12 are retained as shown in FIG. 10.

Figure 11:
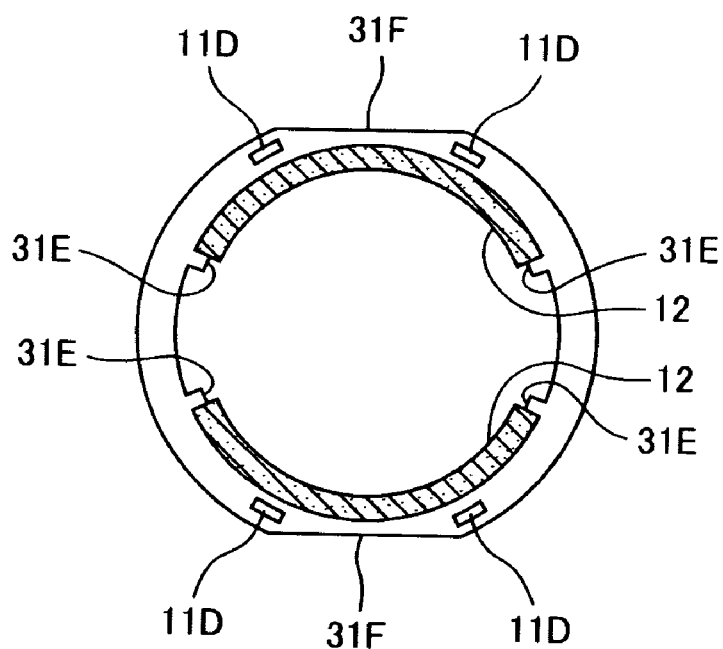
FIG. 11 is a cross-sectional view showing a stator of a commutator motor according to a second modification to the second embodiment of the present invention.

Also, the stator yoke 31 is circular in the outer periphery when viewed in cross-section in the radial direction. However, as shown in FIG. 11, the outer peripheral positions corresponding to positions at which the field magnets 12 are fixed may be linear portions 31F that are linearly notched.

Figure 12:
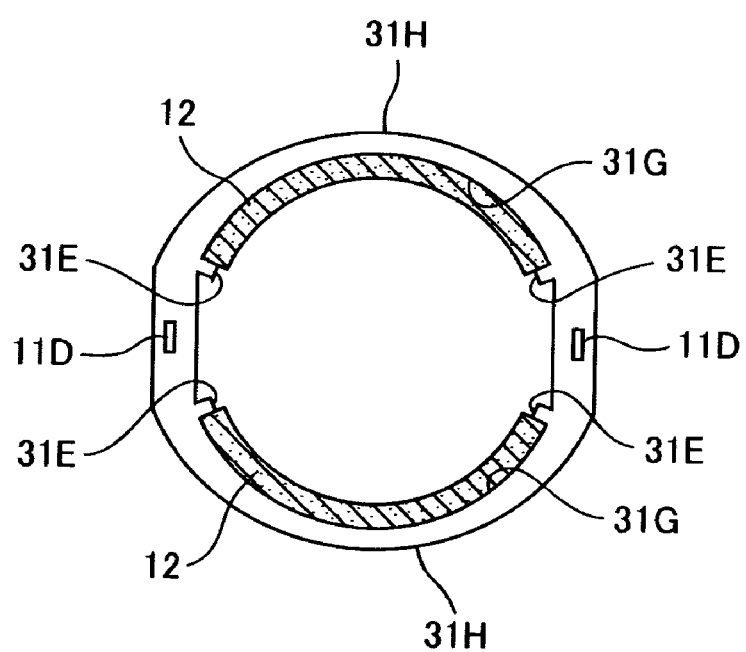
FIG. 12 is a cross-sectional view showing a stator of a commutator motor according to a third modification to the second embodiment of the present invention.

Also, when viewed in cross-section in the radial direction of the stator yoke 31, as shown in FIG. 12, in order to increase the magnetic path area of the stator yoke in the vicinity of both ends of the field magnet 12, that is, in the vicinity of the magnetic poles, it is possible that portions 31H on the outer peripheral surface of the stator yoke are configured by eccentric curves while providing linear portions between opposing convex portions 31E, 31E. In this example, each of the caulking portions 11D may be disposed at the linear portions to which the field magnet 12 is not fixed.

Figure 13:
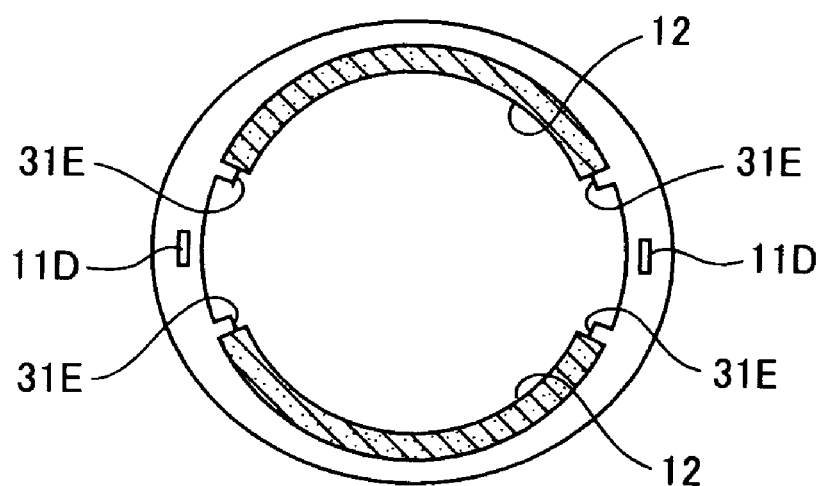
FIG. 13 is a cross-sectional view showing a stator of a commutator motor according to a fourth modification to the second embodiment of the present invention.

Alternatively, it is possible that the inner periphery is concentric and the outer periphery is not concentric. The outer periphery is, for example, an eccentric curve as shown in FIG. 13. In this case, each of the caulking portions 11D may be disposed at a position between the outer periphery and the inner periphery of a portion which is a part of the annular body and at which the field magnet 12 is not fixed.

Figure 14:
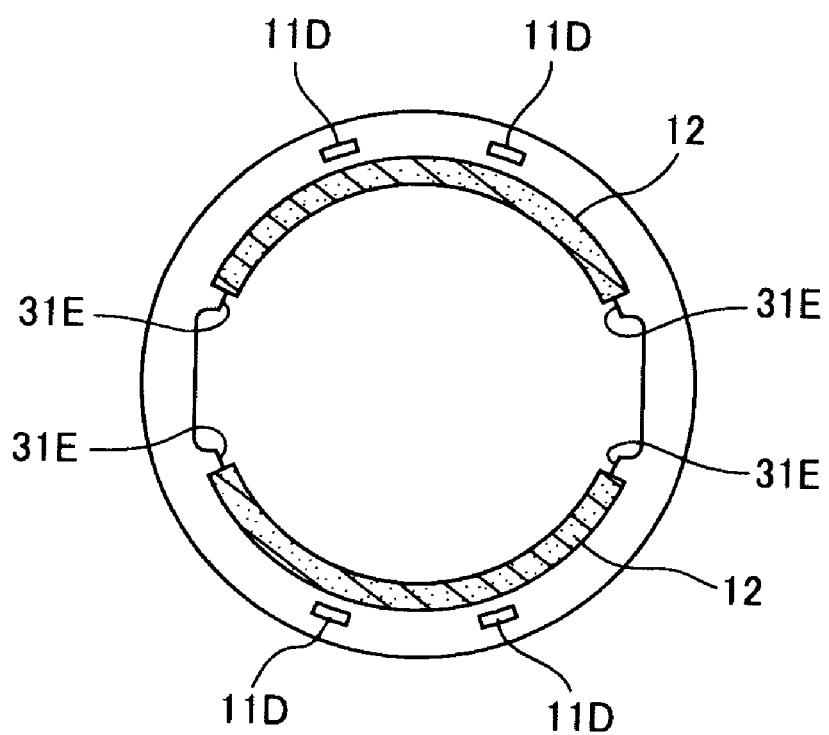
FIG. 14 is a cross-sectional view showing a stator of a commutator motor according to a fifth modification to the second embodiment of the present invention.

Also, as shown in FIG. 14, an inner peripheral surface of the stator yoke is almost circular except a linear region at which the field magnet 12 is not disposed. Even in the cases of the configurations shown in FIGS. 12 to 14, two field magnets 12 are retained on the inner peripheral surface of the stator yoke by two pairs of convex portions 31E, i.e., four in total, as in the second embodiment.

Figure 15:
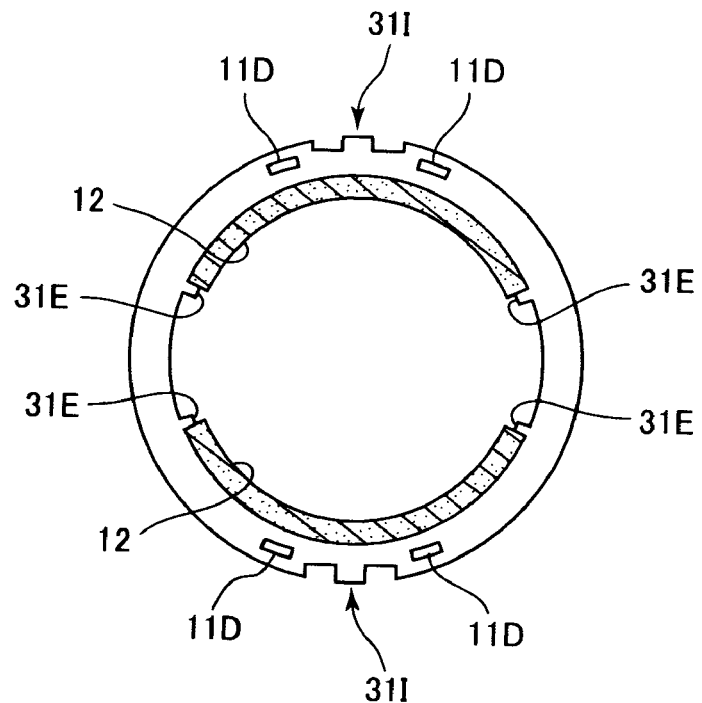
FIG. 15 is a cross-sectional view showing a stator of a commutator motor according to a sixth modification to the second embodiment of the present invention.

Also, as shown in FIG. 15, concave/convex portions 31I are disposed at the outer periphery of the stator yoke. The position of the concave/convex portions 31I correspond to the center of the field magnet 12. The convex/concave portions (not shown) engageable with the concave/convex portions 31I are disposed on the housing, and the concave/convex portions 31I of the stator yoke are engaged with the convex/concave portions of the housing so as to fixedly position the stator yoke to the housing.

Also, a distance in the peripheral direction between the respective pairs of convex portions 31E of the annular body is slight smaller than the length of the field magnet 12 in the same direction. However, the distance may be slightly larger. In the latter case, after the field magnet 12 is inserted between the convex portions 31E, the convex portions 31E are mechanically plastically deformed in a direction that approaches the field magnetic pole to retain the field magnet 12 between the convex portions 31E.

Also, two pairs of convex portions 31E are disposed for one annular body 31C that constitutes a part of the stator yoke 31 for retaining the field magnet 12 on the inner peripheral surface thereof. Alternatively, two pairs of convex portions 31E may not be disposed for one annular body. For example, it is possible that a pair of convex portions for retaining one of two field magnets 12 are disposed in a first annular body and a third annular body, respectively, and a pair of convex portions for retaining the other field magnet 12 are disposed in a second annular body and a fourth annular body, respectively. Also, it is possible that only one convex portions is disposed on the first annular body, and only one convex portions is disposed on the fourth annular body to form a pair of convex portions for retaining one field magnet 12.

Figure 8:
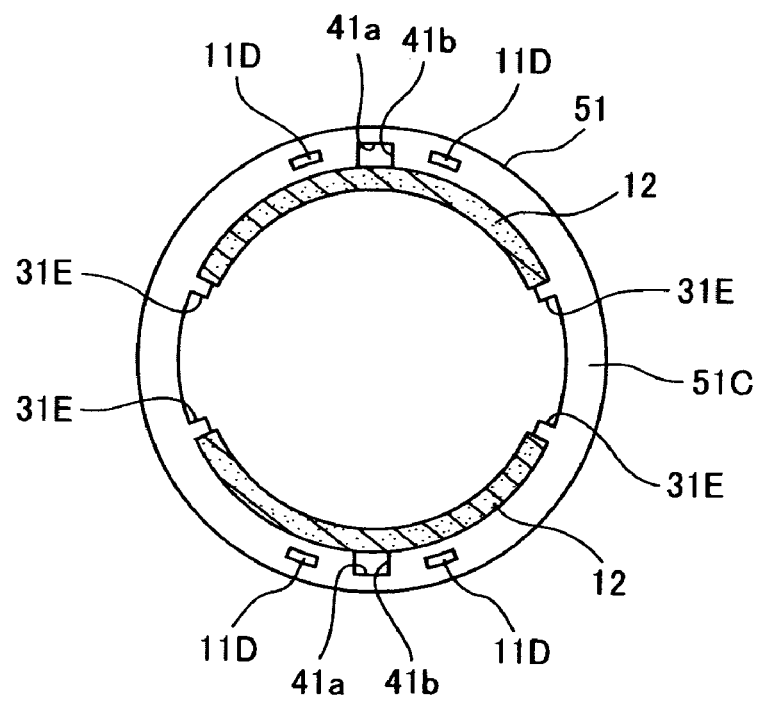
FIG. 8 is a cross-sectional view showing a stator of a commutator motor according to a fourth embodiment of the present invention.

As one preferred modification to the embodiment shown in FIG. 15, instead of two concave/convex portions 31I, only one concave/convex portion is provided at the outer peripheral surface of the stator yoke, and grooves corresponding to the grooves 41a as shown in FIGS. 6 and 8 are formed on the inner peripheral surface of the stator yoke.

Also, in the commutator motor according to the third embodiment, the concave portion 41b is formed with a configuration that is notched in a substantially U-shape toward the exterior of the annular body 41C. However, the shape is not limited to this configuration. For example, the concave portion 41b may have a triangular shape or a substantially semicircular shape.

Also, the grooves 41a are hollow in the above embodiments. However, the stacked annular bodies 41C may be fixedly adhered to each other by filling an adhesive into the hollow space. The filling of the adhesive is conducted in such a manner that after the annular bodies 41C are stacked on each other and the field magnet 12 is fixed on the inner peripheral surface of the stator yoke 41, a tube for filling the adhesive is inserted into one open end of the groove 41a, and the adhesive is injected into the groove 41a. A large vibration may be structurally applied to the commutator motor portion depending on the kind of a power tool. In this case, when the adhesive is filled in the groove 41a, and the respective annular bodies 41C are adhered to each other, the respective annular bodies that are fixed by caulking and stacked on each other at the caulking portion 11D can be prevented from being detached from each other. The filling of the adhesive may also be conducted in the fourth embodiment.

Figure 16:
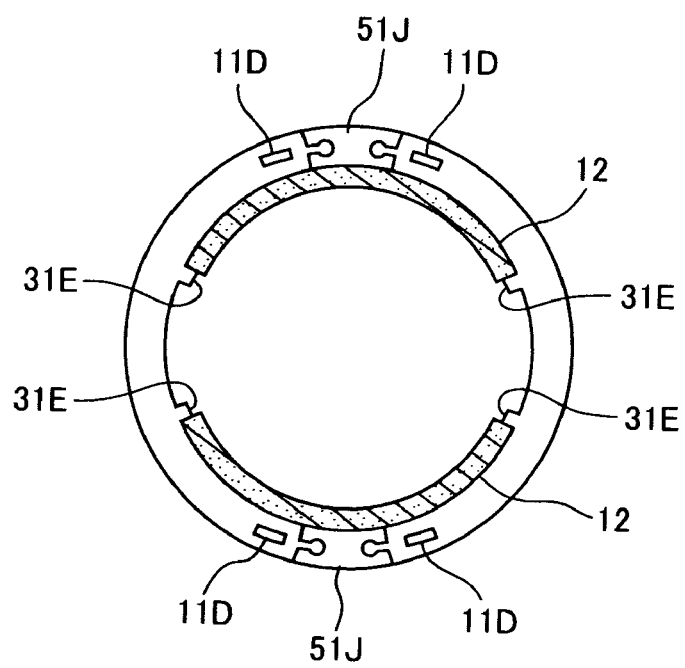
FIG. 16 is a cross-sectional view showing a stator of a commutator motor according to a modification to the fourth embodiment of the present invention.

Also, in the commutator motor according to the fourth embodiment, the grooves 41a are formed. However, as shown in FIG. 16, the grooves 41a may be replaced by non-magnetic bodies 51J. That is, when viewed in cross-section in the radial direction of the stator yoke, a substantially center portion of the stator yoke at a position where the field magnet 12 is fixed may be formed by the non-magnetic body 51J. In this case, the stator yoke is not structured by stacking the annular bodies on each other, but structured in such a manner that a plurality of iron plate-like bodies each of which formed in two substantially semi-circular and substantially the same configuration which form a part of virtual annular bodies are stacked on each other, and bar-like non-magnetic bodies 51J that extend in the axial direction of the stator yoke are connected between end portions of the stacked plate-like bodies, and the stator yoke becomes annular in a cross-section taken along a face perpendicular to the radial direction of the stator yoke. Also, it is possible that each of the annular bodies is made up of two substantially semicircular iron plate-like bodies that form a part of the annular body and two substantially arc-shaped plate-like non-magnetic bodies that connect both ends of the two substantially semi-circular portions, respectively, and the annular bodies are stacked on each other to structure the stator yoke.

Also, in all of the above-mentioned embodiments, the caulking portion 11D is structured in such a manner that one surface side of the plate-like annular body is completely convex portions and the other surface side is completely concave portions. Alternatively, the convex portions and the concave portions may be mixed together on one surface side or the other surface side.

The housing and the stator yoke are structured as separate components in the above-mentioned embodiments, however, the stator yoke may serve as the housing.

The stator yoke can have rectangular or polygonal outer configuration. With this structure, the sectional area of the yoke portion becomes large, thereby making it difficult to have the permanent magnet magnetically saturated.

Further, the battery is used as the power source in the above-mentioned embodiments. However, other type of power source is available.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A commutator motor, comprising:
a stator comprising a stator yoke having a tubular shape and extending in an axial direction and having an inner peripheral surface, and a field magnet fixed to the inner peripheral surface of the stator yoke for providing a field magnetic pole in the stator; and
an armature rotatably disposed within the stator;
wherein the stator yoke is comprising at least one of (a) a plurality of plate-like annular bodies having iron parts which are stacked on each other coaxially in the axial direction of the stator yoke, and (b) a plurality of substantially identically configured iron plate-like arcuate bodies disposed at such position as to form a part of virtual annular bodies and which are stacked on each other coaxially in the axial direction of the stator yoke;
wherein the plurality of plate-like annular bodies or the plate-like arcuate bodies adjacent to each other in the stacked direction are fixedly connected to each other by caulking, wherein a non-magnetic portion is defined by a hollow groove extending in the axial direction of the stator yoke and formed in the inner peripheral surface of the stator yoke with a depth of the groove extending partially into the stator yoke, and
wherein the stator yoke has the non-magnetic portion at a substantially center portion of the field magnetic pole in a radial cross-section of the stator yoke.

2. The commutator motor as claimed in claim 1, wherein the grooves are U-shape, triangular shape or a semi-circular shape.

3. The commutator motor as claimed in claim 1, wherein adhesive is formed in the grooves.

4. The commutator motor of claim 1, wherein the plurality of plate-like annular bodies or the plate-like arcuate bodies each have a concave portion and are fixedly connected to each other by caulking the concave portion and mating to a convex portion of an adjacent one of the plurality of plate-like annular bodies or the plate-like arcuate bodies.

5. A commutator motor, comprising:
a stator comprising a stator yoke having a tubular shape and extending in an axial direction and having an inner peripheral surface, and a field magnet fixed to the inner peripheral surface of the stator yoke for providing a field magnetic pole in the stator; and
an armature rotatably disposed within the stator;
wherein the stator yoke is constituted by one of (a) a plurality of plate-like annular bodies having iron parts which are stacked on each other coaxially in the axial direction of the stator yoke, and (b) a plurality of substantially identically configured iron plate-like arcuate bodies disposed at such position as to form a part of virtual annular bodies and which are stacked on each other coaxially in the axial direction of the stator yoke;
wherein the plurality of plate-like annular bodies or the plate-like arcuate bodies adjacent to each other in the stacked direction are fixedly connected to each other by caulking,
wherein the stator yoke has a non-magnetic portion at a substantially center portion of the field magnetic pole in a radial cross-section of the stator yoke, and
wherein the stator yoke is constituted by a plurality of substantially identically configured iron plate-like arcuate bodies, and wherein the non-magnetic portion is made from a non-magnetic bar members extending in the axial direction of the stator yoke and held between confronting ends of the arcuate bodies, a combination of two arcuate bodies, and two non-magnetic bar members providing an annular body.

* * * * *